United States Patent
Thewes

(10) Patent No.: US 10,215,086 B2
(45) Date of Patent: Feb. 26, 2019

(54) EXHAUST GAS RECIRCULATION SYSTEM FOR AN INTERNAL COMBUSTION ENGINE AND METHOD FOR OPERATING SUCH AN EXHAUST GAS RECIRCULATION SYSTEM

(71) Applicant: FEV GMBH, Aachen (DE)

(72) Inventor: Matthias Thewes, Wurselen (DE)

(73) Assignee: FEV Europe GmbH, Aachen (DE)

( * ) Notice: Subject to any disclaimer, the term of this patent is extended or adjusted under 35 U.S.C. 154(b) by 145 days.

(21) Appl. No.: 15/325,578

(22) PCT Filed: Jun. 16, 2015

(86) PCT No.: PCT/EP2015/063491
§ 371 (c)(1),
(2) Date: Jan. 11, 2017

(87) PCT Pub. No.: WO2016/005152
PCT Pub. Date: Jan. 14, 2016

(65) Prior Publication Data
US 2017/0138252 A1 May 18, 2017

(30) Foreign Application Priority Data
Jul. 11, 2014 (DE) .......... 10 2014 109 805

(51) Int. Cl.
*F02B 37/16* (2006.01)
*F02M 26/04* (2016.01)
(Continued)

(52) U.S. Cl.
CPC ............. *F02B 37/16* (2013.01); *F02M 26/04* (2016.02); *F02M 26/06* (2016.02);
(Continued)

(58) Field of Classification Search
CPC ........ F02B 37/16; F02M 26/04; F02M 26/06; F02M 35/10163; F02M 35/10157; F02M 35/10275; F02M 35/10222; Y02T 10/144
(Continued)

(56) References Cited

U.S. PATENT DOCUMENTS

| | | | |
|---|---|---|---|
| 8,230,675 B2 * | 7/2012 | Pursifull | F02M 26/36 123/568.12 |
| 2008/0133110 A1 * | 6/2008 | Vetrovec | F02B 29/0412 701/103 |

(Continued)

FOREIGN PATENT DOCUMENTS

| | | |
|---|---|---|
| DE | 19641467 A1 | 4/1998 |
| DE | 102010025699 A1 | 1/2012 |

(Continued)

OTHER PUBLICATIONS

International Search Report dated Sep. 18, 2015, International Application No. PCT/EP2015/063491, filed Jun. 16, 2015.

*Primary Examiner* — Hoang M Nguyen
(74) *Attorney, Agent, or Firm* — Dinsmore & Shohl LLP

(57) ABSTRACT

The invention relates to an exhaust gas recirculation system for an internal combustion engine, and to a method for operating an exhaust gas recirculation system of this type. Here, the exhaust gas recirculation system has an air feed line, an exhaust gas line, an exhaust gas recirculation line which leads from an EGR branch-off point in the exhaust gas line to an EGR feed-in point in the air feed line, and a throttle valve within the air feed line downstream of the EGR feed-in point.

11 Claims, 1 Drawing Sheet

(51) Int. Cl.
*F02M 35/10* (2006.01)
*F02M 26/06* (2016.01)
(52) U.S. Cl.
CPC *F02M 35/10157* (2013.01); *F02M 35/10163* (2013.01); *F02M 35/10222* (2013.01); *F02M 35/10275* (2013.01); *Y02T 10/144* (2013.01)
(58) Field of Classification Search
USPC .................................. 60/600, 605.1, 605.2
See application file for complete search history.

(56) References Cited

U.S. PATENT DOCUMENTS

2011/0138807 A1\* 6/2011 Ulrey ..................... F01N 5/02
 60/605.1
2015/0121847 A1\* 5/2015 Pursifull .................. F01N 5/02
 60/274

FOREIGN PATENT DOCUMENTS

| DE | 102010027646 A1 | 1/2012 |
| FR | 2392230 A1 | 12/1978 |
| FR | 2985544 A3 | 7/2013 |
| JP | 2000186629 A | 7/2000 |
| WO | 2010072227 A1 | 7/2010 |

\* cited by examiner

EXHAUST GAS RECIRCULATION SYSTEM FOR AN INTERNAL COMBUSTION ENGINE AND METHOD FOR OPERATING SUCH AN EXHAUST GAS RECIRCULATION SYSTEM

CROSS-REFERENCE TO RELATED APPLICATIONS

This application is the U.S. national phase of PCT/EP2015/063491 filed Jun. 16, 2015, which claims priority of German Patent Application 10 2014 109 805.6 filed on Jul. 11, 2014, which is incorporated herein by reference.

FIELD OF THE INVENTION

The invention relates to an exhaust gas recirculation system for an internal combustion engine, and to a method for operating an exhaust gas recirculation system of this type. More particularly, the exhaust gas recirculation system has an air feed line, an exhaust gas line, an exhaust gas recirculation line which leads from an EGR branch-off point in the exhaust gas line to an EGR feed-in point in the air feed line, and a throttle valve within the air feed line downstream of the EGR feed-in point.

BACKGROUND OF THE INVENTION

A requirement which is made of internal combustion engines and, in particular, of diesel engines is the adherence to limit values for nitrogen oxide emissions, decreasing legal limit values requiring a reduction in said nitrogen oxide emissions. One possibility for reducing nitrogen oxide emissions is feeding parts of the exhaust gas into the combustion chamber, as a result of which an oxygen concentration in the combustion chamber of the cylinder can be set and the peak combustion temperature, in particular in the case of cooled exhaust gas recirculation, can be lowered. Said so-called exhaust gas recirculation (EGR for short) is known and represents one possibility to reduce the oxygen concentration in the combustion chamber of the cylinder. Here, the precise setting of the oxygen concentration in the cylinder during transient operation and also during steady-state operation is of central importance. If the steady-state operation of an internal combustion engine does not make any great requirements of a control system, exhaust gas recirculation has to be determined as precisely as possible, in particular, in transient operation, in order for it to be possible to produce a satisfactory correlation of the nitrogen oxide emissions.

In the case of exhaust gas recirculation, a distinction is made between internal and external exhaust gas recirculation. The return flow of exhaust gas out of the outlet duct into the combustion chamber during a valve overlap phase is called internal exhaust gas recirculation. Here, the level of the internal exhaust gas recirculation depends on a pressure difference between the fresh air feed and the exhaust gas system, on the duration of a valve overlap, and on the opening cross sections which are released by the valves. A further known exhaust gas recirculation is the external exhaust gas recirculation. A distinction is made here between a high-pressure exhaust gas recirculation which makes direct recirculation of the exhaust gases in the region of the exhaust gas manifold into the fresh air feed of the inlet duct possible, and a low-pressure exhaust gas recirculation, in which the exhaust gas is branched off downstream of a turbine (integrated into the exhaust gas system) of a turbocharger and is fed into the fresh air feed upstream of the compressor of the turbocharger.

Exhaust gas recirculation systems of the type mentioned at the outset, with low-pressure exhaust gas recirculation, are disclosed by DE 10 2010 025 699 A1, DE 10 2010 027 646 A1 and WO 2010/072227 A1.

DE 10 2010 025 699 A1 discloses a diesel engine having means for exhaust gas aftertreatment and means for exhaust gas recirculation. An air intake section and an exhaust gas section are provided, at least one soot particulate filter being arranged in the exhaust gas section and an NOx storage catalytic converter being arranged downstream of the latter. An exhaust gas recirculation section branches off from the exhaust gas section and opens into the air intake section. A branch for separating off an exhaust gas part flow is arranged for the exhaust gas recirculation in a housing of the NOx storage catalytic converter. As a result, the NOx storage catalytic converter is not loaded with an excessively great exhaust gas stream, by the exhaust gas part stream for exhaust gas recirculation being precluded to this extent from the exhaust gas aftertreatment. As a result of a thermal transfer between the branch for the exhaust gas recirculation and the housing parts of the NOx storage catalytic converter, furthermore, more rapid heating of the NOx storage catalytic converter advantageously occurs during operation, with the result that the pollutant emissions can be reduced, in particular, in the starting phase of the internal combustion engine.

DE 10 2010 027 646 A1 discloses an exhaust gas system of an internal combustion engine, having an exhaust gas section and exhaust gas recirculation, the exhaust gas recirculation branching off from the exhaust gas section, and the exhaust gas section having a pipe and exhaust gas treatment means. The pipe and/or the exhaust gas treatment means are/is configured at least in sections in such a way that a plurality of lines for exhaust gas are formed, a first line conducting a main exhaust gas stream and a second line conducting an exhaust gas part stream which is branched off for exhaust gas recirculation.

WO 2010/072227 A1 discloses an exhaust gas recirculation system for an internal combustion engine having an exhaust gas turbocharger, an exhaust gas recirculation line being connected firstly for the removal of exhaust gas to an exhaust gas section of the internal combustion engine and being connected secondly to a fresh air feed of the internal combustion engine. The exhaust gas recirculation line is routed via an exhaust gas compressor in order to increase the pressure of the recirculated exhaust gas. As a result of the increased pressure of the recirculated exhaust gas stream, the latter can advantageously be controlled in an improved manner. To this end, a moderate pressure increase can already be sufficient. The pressure level, to which the recirculated exhaust gas is compressed, depends substantially on how and where it is to be fed to the fresh air feed.

In the case of the known low-pressure exhaust gas recirculation systems, in particular in the case of exhaust gas turbocharged internal combustion engines, in particular gasoline engines, that is to say in the case of an introduction of the exhaust gas recirculation upstream of the compressor of the turbocharger, the result is a high dead volume between the EGR feed-in point and the throttle valve, which dead volume is filled with recirculated exhaust gas. In the case of a rapid load reduction, for example as a result of spontaneous decoupling, problems with the combustion stability can occur, since the EGR rate cannot be reduced rapidly enough as a result of the high dead volume and cannot be adapted rapidly enough to the new engine load point.

It is an object of the present invention for it to be possible to adapt the EGR rate more rapidly to changed engine load points.

SUMMARY OF THE INVENTION

The object is achieved by way of an exhaust gas recirculation system for an internal combustion engine, which exhaust gas recirculation system has an air feed line, an exhaust gas line, and exhaust gas recirculation line and a throttle valve. The exhaust gas recirculation line leads from an EGR branch-off point in the exhaust gas line to an EGR feed-in point in the air feed line. The throttle valve is arranged within the air feed line downstream of the EGR feed-in point. Furthermore, a bypass line which can be shut off is provided for fresh air, which bypass line leads to a bypass feed-in point in the air feed line downstream of the throttle valve.

All components which conduct air which is taken in from an inlet opening as far as the internal combustion engine belong to the air feed line. All components which conduct the exhaust gas from the internal combustion engine as far as the surrounding atmosphere belong to the exhaust gas line.

In the case of steady-state operation at high part load or at full load, the bypass line can remain shut off, an adapted EGR rate being fed via the throttle valve to the internal combustion engine. In the case of a sudden load reduction, the throttle valve can immediately be closed completely and at the same time the bypass line can be opened, with the result that the entire dead volume which is enriched with recirculated exhaust gas between the EGR feed-in point and the throttle valve is no longer fed to the internal combustion engine and therefore no longer participates in the combustion process. The EGR rate therefore decreases rapidly, fresh air without a recirculated exhaust gas component being fed to the internal combustion engine via the bypass line.

In the case of a load increase which then occurs suddenly, the bypass line can be closed and at the same time the throttle valve can be opened, it being possible for the dead volume which has already been enriched with recirculated exhaust gas to be fed immediately to the internal combustion engine, with the result that the required EGR rate is achieved very rapidly.

The bypass line can have a dedicated air inlet, or it can branch off fresh air from the air feed line by way of a bypass branch-off point in the air feed line upstream of the EGR feed-in point and can conduct it to the bypass feed-in point.

In order to avoid recirculated exhaust gas penetrating into the bypass line, it can be provided that a check valve is provided within the air feed line, which check valve is arranged between the bypass branch-off point and the EGR feed-in point and permits a throughflow of the air feed line exclusively from the bypass branch-off point in the direction of the EGR feed-in point.

In order to configure the bypass line such that it can be shut off, a bypass valve is preferably provided within the bypass line.

In order to ensure that flow passes through the bypass line only in one direction, it can be provided that a check valve is provided within the bypass line, which check valve permits a throughflow of the bypass line exclusively in the direction of the bypass feed-in point.

At least one exhaust gas turbocharger is preferably provided with a compressor and a turbine, the compressor being arranged within the air feed line and the turbine being arranged within the exhaust gas line, and the compressor being arranged between the EGR feed-in point and the throttle valve.

The turbine of the exhaust gas turbocharger is preferably arranged upstream of the EGR branch-off point, in order to provide a low-pressure exhaust gas recirculation system.

The object is achieved, furthermore, by way of a method for operating an exhaust gas recirculation system as described in the above text, wherein, in the case of an abrupt load reduction, the throttle valve is closed completely and the bypass line being opened.

In the case of a load increase, the bypass line is closed and the throttle valve is opened, with the result that the entire dead volume which is enriched with recirculated exhaust gas between the EGR feed-in point and the throttle valve is no longer fed to the internal combustion engine and therefore no longer participates in the combustion process. The EGR rate therefore decreases very rapidly, fresh air without a recirculated exhaust gas component being fed to the internal combustion engine via the bypass line.

It can be provided that, during idling, idling control takes place in a combined manner via opening and closing of the bypass line and via opening and closing of the throttle valve. As an alternative, it can be provided that, during idling, the idling control takes place exclusively via the opening and closing of the bypass line with a constant throttle valve position, preferably with a closed throttle valve position.

In order to avoid recirculated exhaust gas entering into the bypass line, it can be provided that the bypass line is not opened as long as the pressure is higher at the bypass feed-in point than at the bypass branch-off point.

It can be provided in an emergency operating mode that the throttle valve is held in a constant throttle valve position, preferably in a completely closed manner, and the air supply takes place via the opening and closing of the bypass line.

BRIEF DESCRIPTION OF THE DRAWINGS

Two preferred exemplary embodiments of an exhaust gas recirculation system are shown in the figures and will be explained in greater detail in the following text. In the figures.

DETAILED DESCRIPTION OF THE PREFERRED EMBODIMENTS

Figure 1:
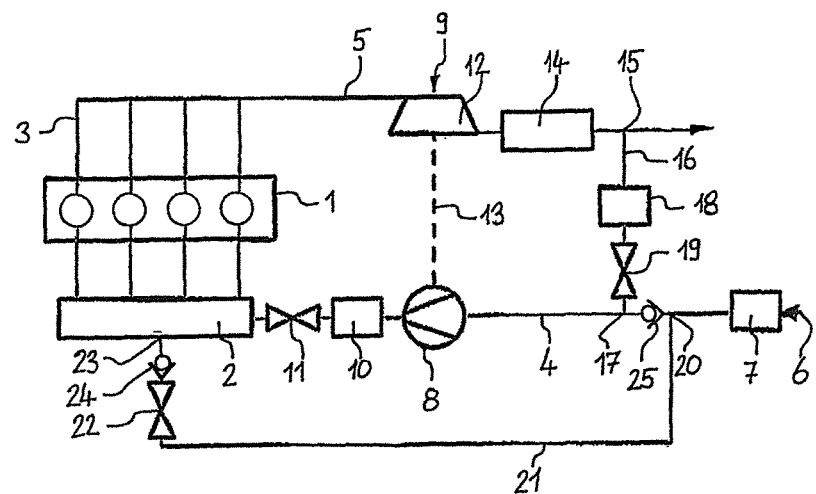
FIG. 1 shows a first exemplary embodiment of an exhaust gas recirculation system having a bypass line which branches off from the air feed line.

FIG. 1 shows a first exemplary embodiment of an exhaust gas recirculation system having an internal combustion engine 1 with an intake manifold 2 for feeding in air, and an exhaust gas manifold 3 for discharging exhaust gas. The intake manifold 2 is connected to an air feed line 4 which sucks in fresh air via an intake opening 6, which fresh air is fed to an air filter 7. From the air filter 7, the air feed line 4 leads further to a compressor 8 of an exhaust gas turbocharger 9, in which compressor 8 the air is compressed. An intercooler 10 for cooling the air which is heated by way of the compression is situated downstream of the compressor 8. The air feed line 4 leads further to a throttle valve 11 for controlling the mass flow of the air which is fed in. Downstream of the throttle valve 11, the air feed line 4 leads further to the intake manifold 2 which likewise can be considered to be a constituent part of the air feed line 4.

The exhaust gas line 5 is connected to the exhaust manifold 3 and leads to a turbine 12 of the exhaust gas turbocharger 9, which turbine 12 is drive-connected via a shaft 13 for driving the compressor 8. The exhaust gases are conducted downstream of the turbine 12 further to an exhaust gas aftertreatment device 14, such as a catalytic converter and/or a particulate filter or the like, and then exit from the exhaust gas line 5.

An EGR branch-off point 15 is situated downstream of the exhaust gas aftertreatment device 14, at which EGR branch-off point 15 exhaust gas can be branched off from the exhaust gas line 5 into an EGR line 16. The EGR line 16 leads to an EGR feed-in point 17 in the air feed line 4, the EGR feed-in point 17 being arranged between the air filter 7 and the compressor 8. An EGR cooler 18 for cooling the exhaust gas is provided within the EGR line 16. Furthermore, an EGR valve 19 is provided within the EGR line 16, between the EGR cooler 18 and the EGR feed-in point 17, via which EGR valve 19 the mass flow of the recirculated exhaust gas can be controlled.

A bypass branch-off point 20 is situated between the air filter 7 and the EGR feed-in point 17, at which bypass branch-off point 20 fresh air can be branched off from the air feed line 4 into a bypass line 21. A bypass valve 22 for controlling the mass flow of the fresh air through the bypass line 21 is situated within the bypass line 21. The bypass line 21 leads further to a bypass feed-in point 23 on the intake manifold 2, the bypass feed-in point 23 being situated downstream of the throttle valve 11.

In order to prevent air which is enriched with exhaust gas passing from the intake manifold 2 into the bypass line 21 when the bypass valve is open, a first check valve 24 is provided within the bypass line 21, which first check valve 24 opens in the direction from the bypass branch-off point 20 to the bypass feed-in point 23 and closes in the opposite direction. In order to prevent, furthermore, air which is enriched with exhaust gas passing out of the EGR line 16 into the bypass line 21, a second check valve 25 is provided, furthermore, which is situated between the bypass branch-off point 20 and the EGR feed-in point 17 and closes in the direction from the EGR feed-in point 17 to the bypass branch-off point 20.

During normal operation of the internal combustion engine 1 at part load or at full load, the bypass line 21 can remain shut off, an adapted EGR rate being fed to the internal combustion engine 1 via the throttle valve 11. In the case of a sudden load reduction, the throttle valve 11 can be closed immediately and at the same time the bypass line 21 can be opened via the bypass valve 22, with the result that the entire dead volume which is enriched with recirculated exhaust gas between the EGR feed-in point 17 and the throttle valve 11 is no longer fed to the internal combustion engine 1 and therefore no longer participates in the combustion process. The EGR rate therefore decreases very rapidly, fresh air without a recirculated exhaust gas component being fed to the internal combustion engine 1 via the bypass line 21.

In the case of a load increase which then again occurs suddenly, the bypass line 21 can be closed via the bypass valve 22 and at the same time the throttle valve 11 can be opened, it being possible for the dead volume which has already been enriched with recirculated exhaust gas to be fed immediately to the internal combustion engine 1, with the result that the required EGR rate is achieved very rapidly.

Figure 2:
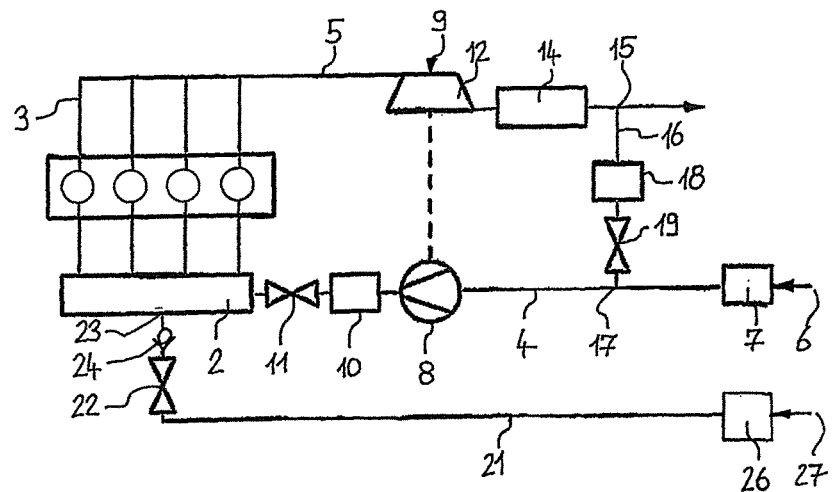
FIG. 2 shows a second exemplary embodiment of an exhaust gas recirculation system having a bypass line which has a dedicated air inlet.

FIG. 2 shows a second exemplary embodiment of an exhaust gas recirculation system, components which coincide with components of the first exemplary embodiment being provided with the same designations and being described in conjunction with the first exemplary embodiment.

In contrast to the first exemplary embodiment, the bypass line 21 does not branch off from the air feed line 4, but rather has a dedicated intake opening 27 as air inlet. Furthermore, a further air filter 26 is provided in the bypass line 21. In addition, no check valve is required in the air feed line 4.

In the two exemplary embodiments which are described, the bypass line, as shown, can open at a bypass feed-in point 23 into the air feed line 4, into the intake manifold 2 here. However, the bypass feed-in-line 23 can open into the air feed line 4 at any desired point or a plurality of desired points. It is important merely that the bypass line 21 opens into the air feed line 4 downstream of the throttle valve 11. It is conceivable, for example, that the bypass line 21 opens into the air feed line 4 between the throttle valve and the intake manifold 2. An introduction of the fresh air from the bypass line 21 in each case into the intake manifolds of the individual cylinders between the intake manifold 2 and the internal combustion engine 1 or in each case into the inlet ducts of each cylinder within the internal combustion engine 1 is also possible.

LIST OF DESIGNATIONS

1 Internal combustion engine
2 Intake manifold
3 Exhaust manifold
4 Air feed line
5 Exhaust gas line
6 Intake opening
7 Air filter
8 Compressor
9 Exhaust gas turbocharger
10 Intercooler
11 Throttle valve
12 Turbine
13 Shaft
14 Exhaust gas aftertreatment device
15 EGR branch-off point
16 EGR line
17 EGR feed-in point
18 EGR cooler
19 EGR valve
20 Bypass branch-off point
21 Bypass line
22 Bypass valve
23 Bypass feed-in point
24 First check valve
25 Second check valve
26 Air filter
27 Intake opening

The invention claimed is:
1. An exhaust gas recirculation system for an internal combustion engine, the exhaust gas recirculation system comprising;
   an air feed line,
   an exhaust gas line,
   an exhaust gas recirculation line which leads from an exhaust gas recirculation branch-off point in the exhaust gas line to an EGR feed-in point in the air feed line, and a throttle valve within the air feed line downstream of the EGR feed-in point, and a bypass line for fresh air, is connected to the air feed line downstream of the throttle valve at a feed in point, wherein the bypass line leads from a bypass branch-off point in the air feed line upstream of the EGR feed-in point to the bypass feed-in point and a check valve is provided within the air feed line, the check valve is arranged between the bypass branch-off point and the EGR feed-in point and permits a throughflow of the air feed line exclusively from the bypass branch-off point in the direction of the EGR feed-in point.

2. The exhaust gas recirculation system of claim 1, comprising; a bypass valve for shutting off the bypass line is provided within the bypass line.

3. The exhaust gas recirculation of claim 1, comprising; in that a check valve is provided within the bypass line, the check valve permits a throughflow of the bypass line exclusively in the direction of the bypass feed-in point.

4. The exhaust gas recirculation system of claim 1, comprising; a turbocharger which is provided with a compressor within the air feed line and a turbine within the exhaust gas line, the compressor being arranged between the EGR feed-in point and the throttle valve.

5. The exhaust gas recirculation system as claimed in claim 4, wherein the turbine of the turbocharger is arranged upstream of the EGR branch-off point.

6. A method for operating an exhaust gas recirculation system as for an internal combustion engine comprising the steps of;

providing an air feed line, providing an exhaust recirculation line connected between an EGR branch-off paint in the exhaust gas line and an EGR feed in point in the air feed line, providing a throttle valve within the air feed line downstream of the EGR feed in point;

providing a bypass line for delivering fresh air connecting the bypass line to the air feed line downstream of the throttle valve, wherein the bypass line leads from a bypass branch-off point in the air feed line upstream of the EGR feed-in point to the bypass feed-in point;

providing a check valve within the air feed line, the check valve is arranged between the bypass branch-off point and the EGR feed-in point and permits a throughflow of the air feed line exclusively from the bypass branch-off point in the direction of the EGR feed-in point and closing the throttle valve and opening the bypass line when there is an abrupt load reduction.

7. The method as claimed in claim 6, comprising, closing the bypass line when there is a load increase.

8. The method of claim 6, comprising; controlling idling, in a combined manner via opening and closing of the bypass line and the throttle valve.

9. The method as claimed in claim 6, comprising, controlling idling exclusively via opening and closing of the bypass line with a constant throttle valve position, preferably with a completely closed throttle valve.

10. The method as claimed in claim 6, comprising maintaining the bypass line in a closed position until the pressure is higher at the bypass feed-in point than at the bypass branch-off point.

11. The of claim 6, comprising, providing an emergency operating mode, by holding the throttle valve in a constant throttle valve position, in a completely closed manner, and the air supply takes place via the opening and closing of the bypass line.

* * * * *